(12) United States Patent
Tomiyoshi et al.

(10) Patent No.: US 8,967,389 B2
(45) Date of Patent: Mar. 3, 2015

(54) DOCUMENT RECYCLE BOX

(71) Applicant: Japan Cash Machine Co., Ltd., Osaka (JP)

(72) Inventors: Tetsuya Tomiyoshi, Osaka (JP); Katsuya Sadahiro, Osaka (JP); Kengo Akashi, Osaka (JP)

(73) Assignee: Japan Cash Machine Co., Ltd., Osaka (JP)

( * ) Notice: Subject to any disclaimer, the term of this patent is extended or adjusted under 35 U.S.C. 154(b) by 93 days.

(21) Appl. No.: 13/746,533

(22) Filed: Jan. 22, 2013

(65) Prior Publication Data
US 2013/0186730 A1    Jul. 25, 2013

(30) Foreign Application Priority Data

Jan. 23, 2012   (JP) .................................. 2012-11569

(51) Int. Cl.
*B07C 5/00* (2006.01)
*G07D 9/00* (2006.01)
*B65G 15/28* (2006.01)
*G07D 11/00* (2006.01)
*G07F 7/04* (2006.01)

(52) U.S. Cl.
CPC ............ *B65G 15/28* (2013.01); *G07D 11/0006* (2013.01); *G07D 11/0081* (2013.01); *G07F 7/04* (2013.01); *Y10S 902/12* (2013.01)
USPC ........... 209/534; 198/347.3; 194/344; 902/12

(58) Field of Classification Search
USPC .......... 198/347.3, 344, 350; 271/298; 902/12; 209/534
See application file for complete search history.

(56) References Cited

U.S. PATENT DOCUMENTS

| | | | | |
|---|---|---|---|---|
| 5,372,361 | A | * | 12/1994 | Isobe et al. ..................... 271/181 |
| 5,662,202 | A | * | 9/1997 | Suris ............................. 194/206 |
| 5,735,516 | A | * | 4/1998 | Gerlier et al. ................... 270/60 |
| 6,367,692 | B1 | * | 4/2002 | Junkins et al. ................ 235/379 |
| 6,371,473 | B1 | * | 4/2002 | Saltsov et al. ................ 271/3.01 |
| 6,585,098 | B2 | * | 7/2003 | Satou et al. ................... 194/206 |
| 6,773,009 | B2 | * | 8/2004 | So ................................. 271/259 |

(Continued)

FOREIGN PATENT DOCUMENTS

| JP | 58150174 U | 10/1983 |
|---|---|---|
| JP | 60245095 A | 12/1985 |

(Continued)

OTHER PUBLICATIONS

International Search Report for International Application No. PCT/JP2013/000294 dated Jul. 2, 2013.

(Continued)

*Primary Examiner* — Douglas Hess
(74) *Attorney, Agent, or Firm* — Bachman & LaPointe, P.C.

(57) ABSTRACT

A document recycle box is provided to comprise: a housing 60, a cover 52 rotatably attached to housing 60, a convey belt device 51 of a recycle conveyor device 50 attached to one of housing 60 or cover 52 along one side of a recycle pathway 11 extending within housing 60, a plurality of rollers 53 of recycle conveyor device 50 attached to the other of housing 60 or cover 52 along the other side of recycle pathway 11 on the opposite side of conveyor belt device 51, and a drum device 43 rotatably disposed within housing 60. Cover 52 may be released from housing 60 to move recycle conveyor 50 away from rollers 53 to easily remove a jammed document within recycle pathway 11.

11 Claims, 15 Drawing Sheets

(56) References Cited

U.S. PATENT DOCUMENTS

| | | |
|---|---|---|
| 6,971,573 B2 | 12/2005 | Fujioka |
| 7,051,926 B2 * | 5/2006 | Saltsov et al. ............. 235/379 |
| 7,216,591 B2 * | 5/2007 | Katou et al. ............. 104/206 |
| 7,225,911 B2 * | 6/2007 | Yokoi et al. ............. 194/205 |
| 7,255,216 B2 | 8/2007 | Izawa et al. |
| 7,441,695 B1 | 10/2008 | Saltsov et al. |
| 7,708,192 B2 * | 5/2010 | Yokoi et al. ............. 235/379 |
| 8,256,603 B2 * | 9/2012 | Gauselmann ............. 194/206 |

FOREIGN PATENT DOCUMENTS

| | | |
|---|---|---|
| JP | H09326063 A | 12/1997 |
| JP | 11339100 A | 12/1999 |
| JP | 2007133467 A | 5/2007 |
| JP | 2011-113472 A | 6/2011 |

OTHER PUBLICATIONS

Japanese Office Action for Application No. 2013-9682 dated May 27, 2014.

* cited by examiner

DOCUMENT RECYCLE BOX

TECHNICAL FIELD

This invention relates to a document recycle box of high antitheft security removably attached to a document validator for receiving documents in the recycle box from outside for storage and for discharging stored documents outside of the recycle box.

BACKGROUND OF THE INVENTION

A bill validator is known that may store validated bills in a recycle box and also may dispense stored bills from the recycle box, for example, as disclosed by Japanese Patent Disclosure No. 2011-113472 and U.S. Pat. No. 6,971,573. In the bill validator of this type, bills are accumulated and retained in the recycle box attached to the bill validator to dispense stored bills from the recycle box and this recycling system can make it possible to advantageously reduce risks of depleting bills stored in the recycle box and also to promptly distribute to users bills from the recycle box.

U.S. Pat. No. 7,255,216 demonstrates a bill handler capable of preventing jamming of a bill conveyed along a passageway to avoid necessity of removing or restoring the jamming of transported bills while rapidly processing bills by the handler. A typical bill handler comprises a validator for transporting bills, a stacker for storing undistributed bills other than dispensed bills, and a recycle box removably attached to the validator through connectors for saving and dispensing bills. The validator comprises a discriminating sensor for detecting whether the bill is dispensable or retained, a conveyor device for transporting bills in the forward or adverse direction between the discriminating sensor and connectors to store retained bills in the stacker or to store dispensable bills in the recycle box.

An object of the present invention is to provide a document recycle box of high antitheft security. Another object of the present invention is to provide a document recycle box capable of easily removing a jammed document in the recycle box. Still another object of the present invention is to provide a document recycle box removably attached to a document validator for receiving documents sent from the document validator for storage and for returning stored documents to the document validator.

SUMMARY OF THE INVENTION

The document recycle box of the present invention comprises: a housing (60), a cover (52) rotatably attached to housing (60), a convey belt device (51) of a recycle conveyor device (50) attached to one of housing (60) or cover (52) along one side of a recycle pathway (11) extending within housing (60), a plurality of rollers (53) of recycle conveyor device (50) attached to the other of housing (60) or cover (52) along the other side of recycle pathway (11) on the opposite side of conveyor belt device (51), and a drum device (43) rotatably disposed within housing (60). Drum device (43) winds up or involves inside documents supplied through recycle pathway (11) for storage of documents within drum device (43) that then unwinds stored documents to discharge them out of housing (60) through recycle pathway (11) by operation of recycle conveyor (50). Cover (52) may be released from housing (60) to move recycle conveyor (50) away from rollers (53) to easily remove a jammed document within recycle pathway (11). Recycle pathway (11) in an embodiment of the invention has a high antitheft structure that comprises a slit (61) formed between housing (60) and cover (52), and a lane (65) formed above slit (61) and between the drum device (43) and recycle pathway (11) for communication of lane (65) with slit (61). This structure would make it very difficult to fraudulently draw documents within drum device (43) by inserting any extracting tool through slit (61) and lane (65). It is very easy for operators to maintain, manage and repair the document recycle box because the jammed documents may easily be removed from recycle pathway (11). Antitheft security is more improved as well because the structure can toughen unauthorized extraction prevention of documents from the recycle box.

BRIEF DESCRIPTION OF THE DRAWINGS

The above-mentioned and other objects and advantages of the present invention will be apparent from the following description in connection with preferred embodiments shown in the accompanying drawings wherein.

BEST MODE FOR CARRYING OUT THE INVENTION

Figure 1:
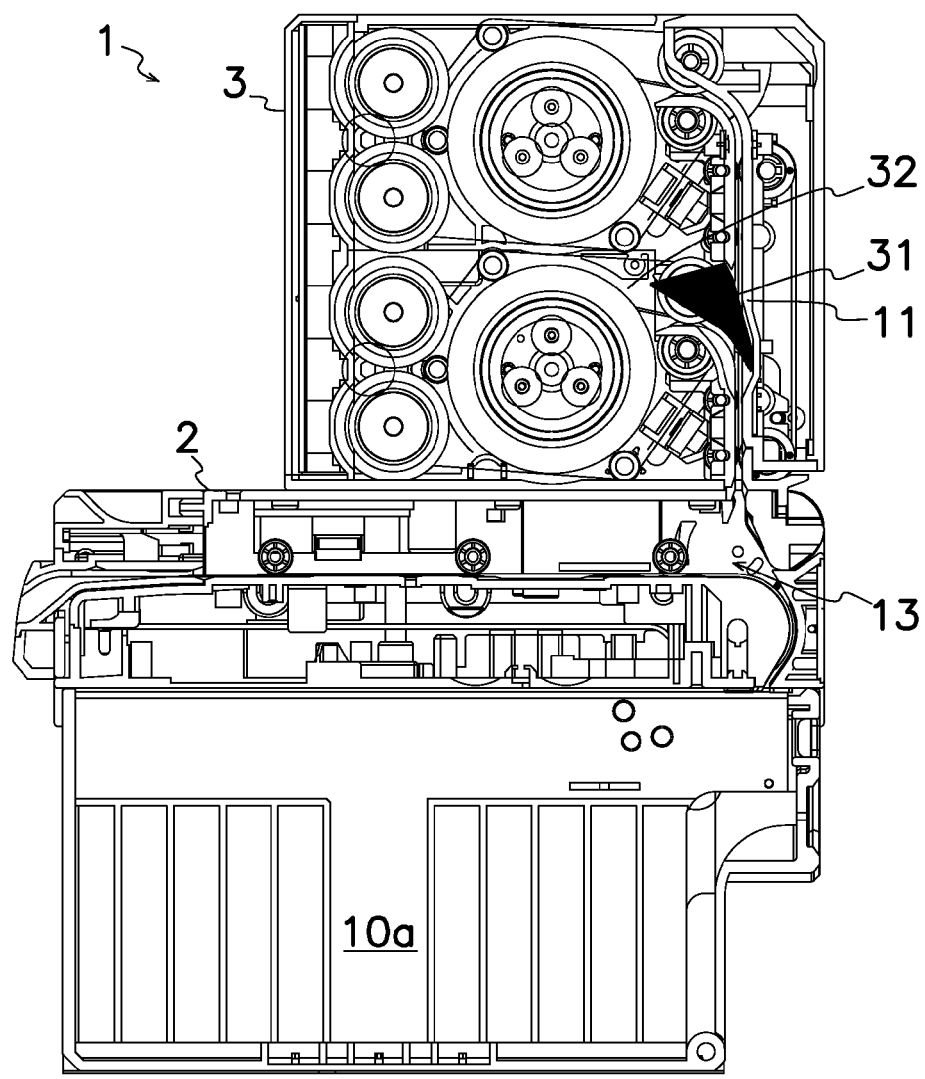
FIG. 1 is a sectional view of the bill validator with a document recycle box according to the present invention.
Figure 2:
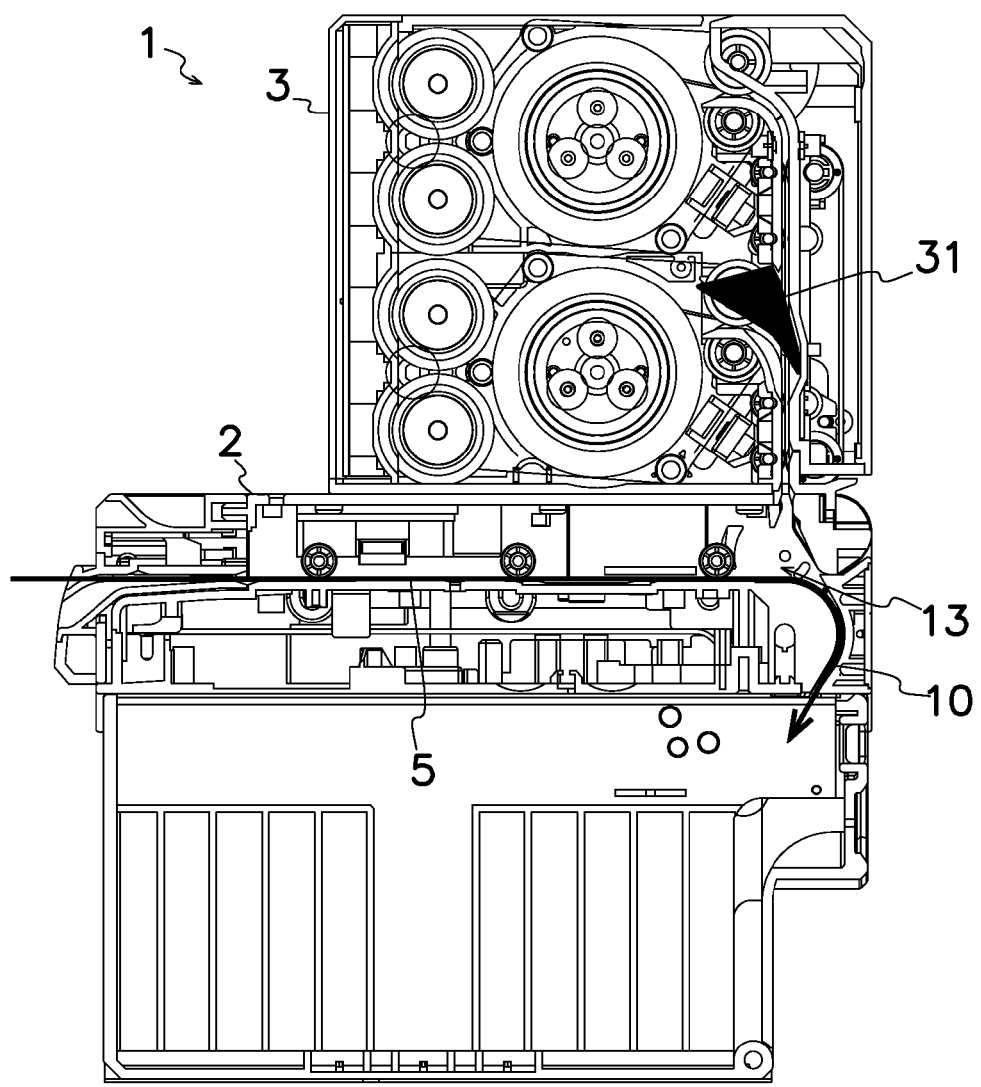
FIG. 2 is a sectional view of the bill validator indicating a bill transported from a shuttle pathway to a reserve pathway.

In connection with FIGS. 1 to 22 of the drawings, embodiments will be described hereinafter regarding a document validator with the document recycle box according to the present invention.

The document recycle box according to the present invention may removably be attached to a document or bill validator 2 as a document or bill recycle box 3. As seen from FIG. 8, document validator 2 comprises a case 4 formed with an inlet 6 and an opening 18 formed in a position away from inlet 6, a turning device 13 that has a deflector 20 arranged in a Y-shaped junction or trifurcate intersection 7 for rotatable support of deflector 20 on a pivot shaft 12 attached within case 4. Validator 2 also comprises three pathways, i.e. a shuttle pathway 5 horizontally extending between inlet 6 and intersection 7, a reserve pathway 10 downwardly extending from intersection 7 and a recycle pathway 11 upwardly extending from intersection 7 through opening 18 of case 4. Shuttle, reserve and recycle pathways 5, 10 and 11 are connected to different portions of trifurcate intersection 7 to radiate from trifurcate intersection 7 in the different directions. Validator 2 further comprises a conveyance device 9 for transporting a document along shuttle, reserve and recycle pathways 5, 10 and 11, and a validation sensor 8 arranged in the vicinity of shuttle pathway 5 for detecting optical and/or magnetic characteristics of a bill transported along shuttle pathway 5.

Not mentioned in detail, however, conveyance device 9 may comprise known conveyor belts, rollers or combined belts and rollers and drive devices for operating these power transmission devices to transport bills in an appropriate manner along shuttle, reserve and recycle pathways 5, 10, 11.

Trifurcate intersection 7 comprises a bottom surface 7a communicating with shuttle and reserve pathways 5, 10, a forward surface 7b communicating with shuttle and recycle pathways 5, 11 and a backward surface 7c communicating with reserve and recycle pathways 10 and 11. Bottom surface 7a slopes at a slightly downward angle from shuttle pathway 5 toward reserve pathway 10. Forward surface 7b slopes at an angle of approximately 45 degrees from shuttle pathway 5 toward recycle pathway 11. Backward surface 7c is formed for a mirror image of or symmetrically to forward surface 7b with an inclination at an angle of approximately −45 degrees between reserve and recycle pathways 10 and 11. However, ordinary skill in the art would modify or change the shape and structure of trifurcate intersection 7 as necessary.

Reserve pathway 10 is connected to a reserve chamber 10a of a bill stacker (not shown) mounted in bill validator 2 so that a bill may be forwarded from shuttle pathway 5 to reserve pathway 10 and then directly stored in reserve chamber 10a of bill stacker. Otherwise, the bill may be returned or transported to recycle or shuttle pathway 11 or 5.

Turning device 13 has a deflector 20 arranged in trifurcate intersection 7 and rotatably supported on a pivot shaft 12 attached within a case 4. Deflector 20 has a baffle 14 rotatably mounted on pivot shaft 12 in intersection 7, and a crescent 15 rotatably mounted on pivot shaft 12 in intersection 7 for rotation of crescent 15 on pivot shaft 12 independently of baffle 14. Deflector 20 is formed into an assembled unit or module of baffle 14, crescent 15 and pivot shaft 12 so that deflector 20 has a generally triangular section with three inwardly concave sides 24, 25 and 26 and three vertexes 21, 22 and 23 defined between each pair of trilateral concave sides 24, 25 and 26. Turning device 13 also has an actuating device 30 that comprises a baffle actuator 16 for rotating baffle 14 on pivot shaft 12 and a crescent actuator 17 for rotating crescent 15 on pivot shaft 12. By operation of baffle actuator 16, a bottom vertex 21 of baffle 14 may come into contact or close to bottom surface 7a of intersection 7 to shut down a bottom gate 27 between shuttle and reserve pathways 5, 10 or may come free from bottom surface 7a of intersection 7 to open bottom gate 27. By operation of crescent actuator 16 in one direction, forward and backward vertexes 22 and 23 of crescent 15 may come into contact or close to forward and backward surfaces 7b and 7c respectively to shut down forward gate 28 between recycle and shuttle pathways 11 and 5 and to shut down backward gate 29 between reserve and recycle pathways 10 and 11. By operation of crescent actuator 16 in the other direction, forward and backward vertexes 22 and 23 may also come free from forward and backward surfaces 7b and 7c respectively to open forward gate 28 between shuffle and recycle pathways 5 and 11 and to open backward gate 29 between reserve and recycle pathways 10 and 11.

When baffle 14 is rotated on pivot shaft 12 by operation of baffle actuator 16, bottom vertex 21 of baffle 14 comes into contact or close to bottom surface 7a of intersection 7 to shut down a bottom gate 27 between shuttle and reserve pathways 5 and 10 or moves away from bottom surface 7a to open bottom gate 27. When crescent 15 is rotated on pivot shaft 12 by operation of crescent actuator 17 in one direction, forward and backward vortexes 22 and 23 of crescent 15 come into contact or close to respectively forward and backward surfaces 7b and 7c of intersection 7 to shut down forward gate 28 between shuttle and recycle pathways 5 and 11 and backward gate 29 between reserve and recycle pathways 10 and 11. By operation of crescent actuator 17 in the other direction, backward vortexes 22 and 23 move away from forward and backward surfaces 7b and 7c to open respectively forward gate 28 between shuttle and recycle pathways 5 and 11 and open backward gate 29 between reserve and recycle pathways 10 and 11. In this way, rotation of deflector 20, namely baffle 14 and crescent 15 may cause at least one of three vertexes 21, 22 and 23 to come into contact or close to or to come free from related bottom, forward or backward surface 7a, 7b and 7c to close and open at least one of gates 27, 28 and 29 located between selected two of shuttle, reserve and recycle pathways 5, 10, 11 for control of bill's passage through gates 27, 28 and 29.

Recycle box 3 comprises a housing 60, a cover 52 rotatably attached by a pin 64 to housing 60, recycle pathway 11 connected to opening 18 of case 4 to generally vertically extend within housing 60, and a recycle conveyor device 50 attached along recycle pathway 11 for a part of conveyance device 9. Recycle conveyor 50 comprises a conveyor belt device 51 supported on cover 52 along one side of recycle pathway 11, a plurality of rollers 53 rotatably attached to housing 60 along the other side of recycle pathway 11, a drum device 43 that has lower and upper drums 41 and 42 rotatably disposed in a vertically spaced relation to each other within housing 60, a sorter 31 mounted generally midway of recycle pathway 11 within housing 60 for sorting bills transported along recycle pathway 11 into lower or upper drum 41 or 42, and a sorter actuator 32 for driving sorter 31 by drive signals from validator control device not shown. Recycle pathway 11 comprises a slit 61 formed between housing 60 and cover 52, a lower passage 62 connecting between lower drum 41 and recycle pathway 11 over slit 61 to feed bills to and remove them from lower drum 41, and a upper passage 63 connecting between upper drum 42 and recycle pathway 11 over slit 61 to feed bills to or remove them from upper drum 42. Each winding/unwinding port of lower and upper drums 41 and 42 is communicated with respectively lower and upper passages 62 and 63 led to recycle pathway 11 to wind around or unwind from lower and upper drums 41 and 42 bills of predetermined denomination through recycle pathway 11 so that bills may be saved in lower and upper drums 41 and 42 and dispensed through lower and upper passages 62 and 63 and recycle pathway 11 as necessary. As understood from FIGS. 15 and 16, conveyor belt device 51 of recycle conveyor device 50 is operated to deliver bills through recycle pathway 11.

Conveyance device 9, baffle actuator 16 and crescent actuator 17 are electrically connected to a validation controller not shown that controls each operation of conveyance device 9 and baffle and crescent actuators 16 and 17 in accordance with detection signals from validation sensor 8. Each of baffle, crescent and sorter actuators 16, 17 and 32 may comprise electric motors, solenoids or springs not shown. If they comprises springs, a leading edge of conveyed bills may overcome resilient force of springs by delivery power applied to bills to forcibly move baffle 14, crescent 15 or sorter 31 to their opened position to certainly define openable gates 27, 28 and 29 at trifurcate intersection 7 and along recycle pathway 11 in recycle box 3.

Recycle pathway 11 in recycle box 3 extends from slit 61 in the upwardly vertical direction. Lower and upper drums 41 and 42 are disposed respectively beneath and over sorter 31 and driven by drive signals from validation controller to cause lower and upper drums 41 and 42 to communicate with recycle pathway 11 through respectively lower and upper passages 62 and 63 so that bills are supplied through recycle pathway 11 to wind around lower or upper drum 41 or 42 or conversely bills are unwound from lower or upper drum 41 or 42 to discharge them from recycle box 3. To this end, bills may be wound around each of lower and upper drums 41 and 42 during their forward rotation to keep bills of respective specific denomination inside drums 41 and 42. To the contrary, bills may be unwound from each of lower and upper drums 41 and 42 during their adverse rotation to release and discharge them out of recycle box 3 through recycle pathway 11 by operation of recycle conveyor device 50. In this way, recycle box 3 serves to receive and keep bills transported through opening 18 and recycle pathway 11 and also to dispense retained bills through recycle pathway 11 and opening 18.

Bills are transported along recycle pathway 11 by recycle conveyor device 50 to store them in lower or upper drum 41 or 42 of drum device 43, and adversely, bills retained in lower or upper drum 41 or 42 are discharged out of housing 60 through recycle pathway 11 by recycle conveyor device 50. Together with cover 52 opened from housing 60, a plurality of rollers 53 are moved away from conveyor belt device 51 along recycle pathway 11 to easily remove a jammed bill within recycle pathway 11. It is apparent that the embodiment shown in FIGS. 15 and 16 would make it very difficult to fraudulently draw bills within lower or upper drum 41 or 42 by inserting any extracting tool through slit 61 formed between housing 60 and cover 52 and lower or upper passage 62 or 63 formed at the back of slit 61 and recycle pathway 11 within housing 60.

Figure 8:
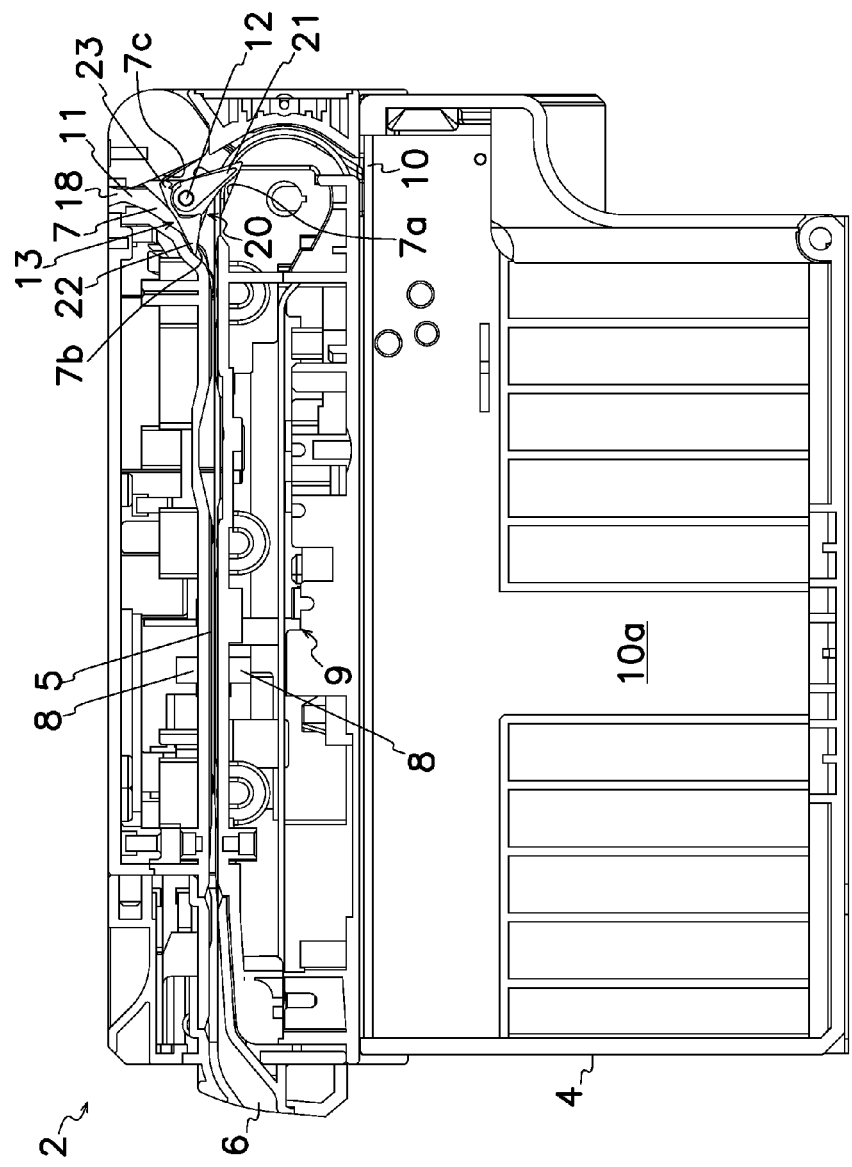
FIG. 8 is a sectional view of the bill validator with a deflector in the original position without the recycle box.
Figure 9:
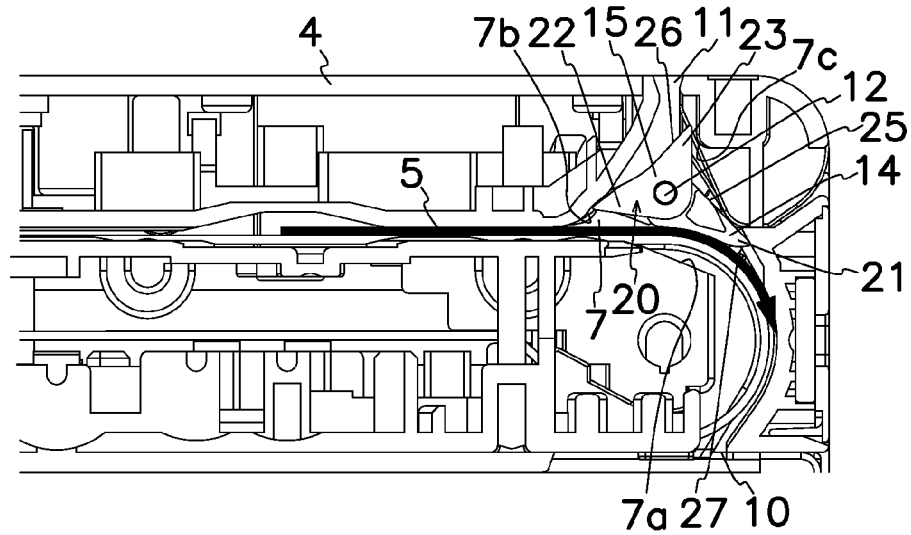
FIG. 9 is a partially enlarged sectional view of a trifurcate intersection with a deflector in a reserve position, indicating a bill transported from a shuttle pathway to a reserve pathway.
Figure 10:
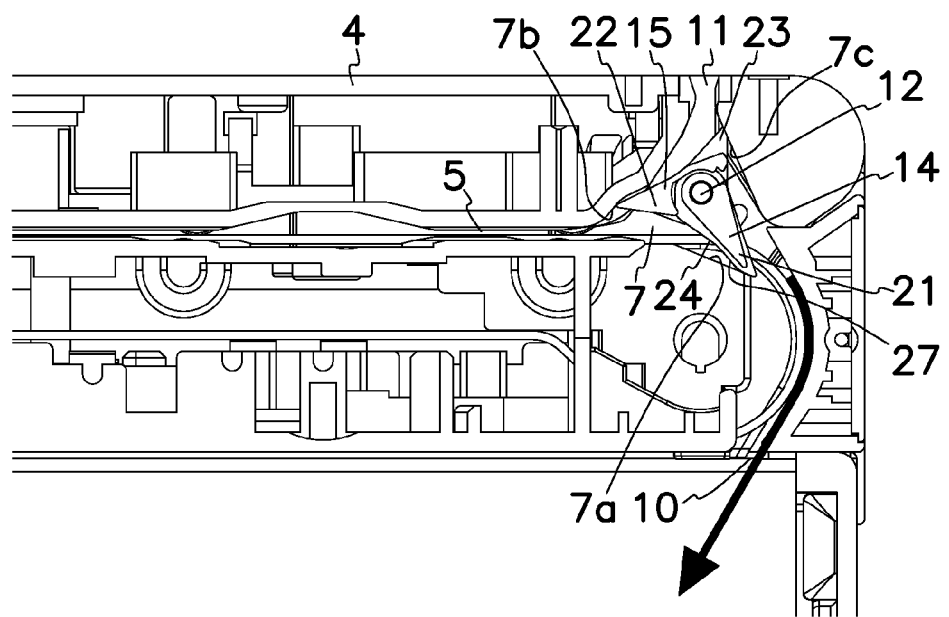
FIG. 10 is a partially enlarged sectional view of the trifurcate intersection with the deflector returned from the reserve position to the original position, after the bill has completely passed the trifurcate intersection from the shuttle pathway to the reserve pathway.
Figure 11:
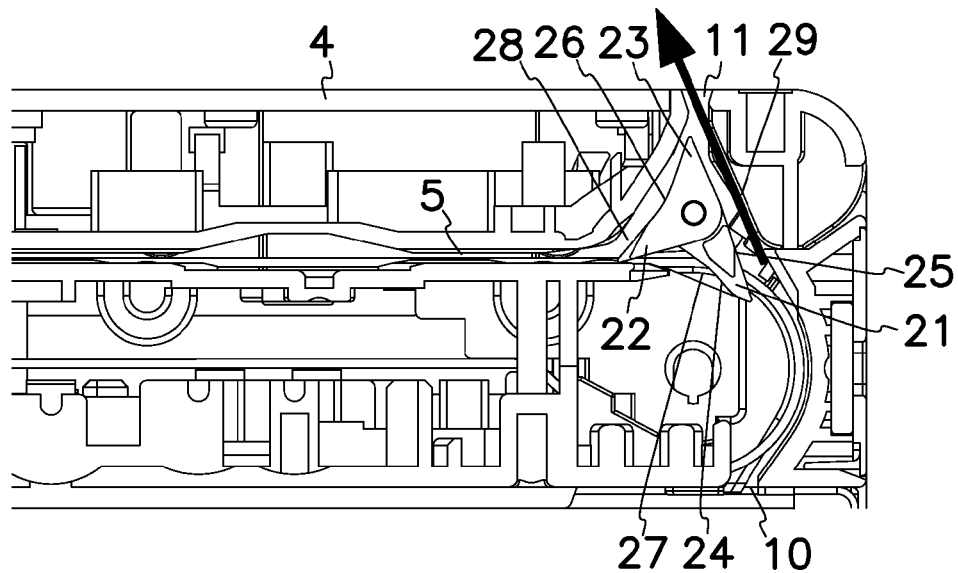
FIG. 11 is a partially enlarged sectional view of the trifurcate intersection with the deflector in the deposit position, indicating a bill transported from the reserve pathway to a recycle pathway.
Figure 12:
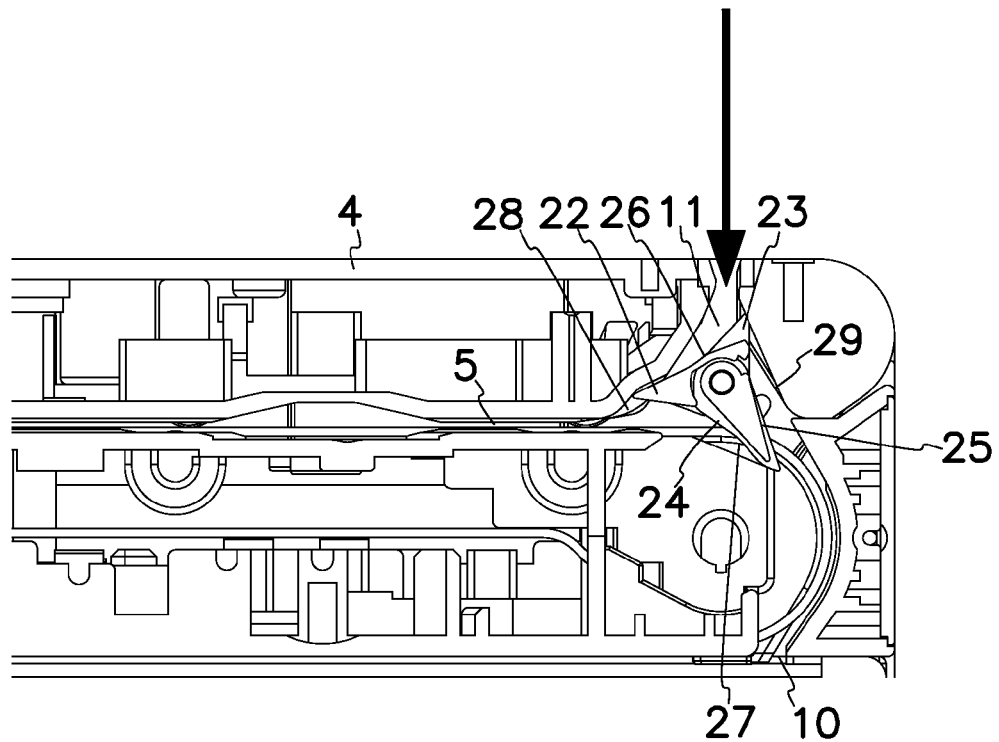
FIG. 12 is a partially enlarged sectional view of the trifurcate intersection with the deflector in the original position, indicating a bill transported from the recycle pathway toward the shuttle pathway.
Figure 13:
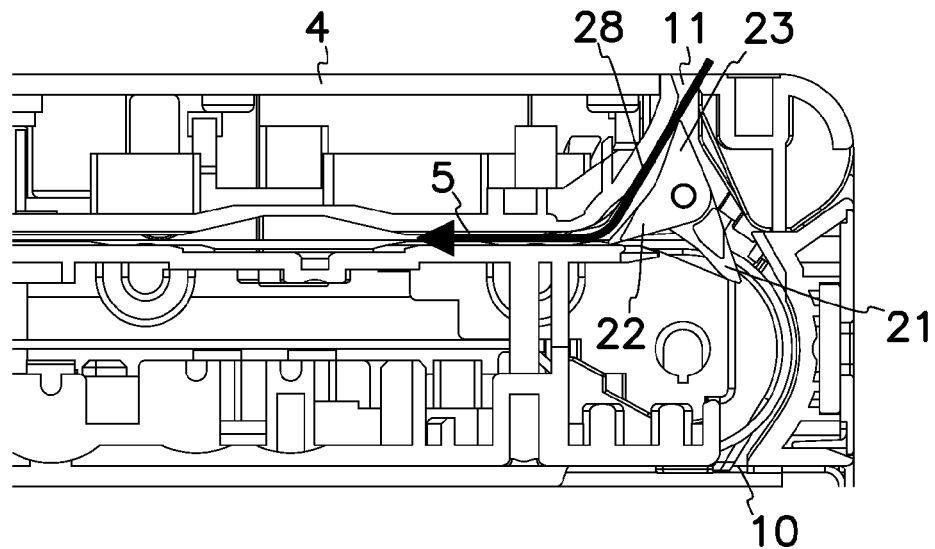
FIG. 13 is a partially enlarged sectional view of the trifurcate intersection with the deflector in the recycle position, indicating the bill that is passing the intersection.

FIGS. 8, 10 and 12 illustrate deflector 20 in the original position wherein bottom vertex 21 of baffle 14 comes into contact or close to bottom surface 7a of trifurcate intersection 7 to block bottom gate 27 between shuttle and reserve pathways 5 and 10 and wherein forward and backward vertexes 22 and 23 come into contact or close to respectively forward and backward surfaces 7b and 7c to block forward and backward gates 28 and 29. FIG. 9 illustrates deflector 20 in the reserve position wherein baffle actuator 16 is operated to rotate baffle 14 to move bottom vertex 21 of baffle 14 away from bottom surface 7a to ensure opened bottom gate 27 between shuttle and reserve pathways 5 and 10 so that a bill may pass bottom gate 27 without operating crescent actuator 17 while leaving forward and backward vertexes 22 and 23 in contact or close to respectively forward and backward surfaces 7b and 7c. FIG. 11 shows deflector 20 in the deposit position wherein crescent actuator 17 is operated to rotate crescent 15 to move backward vertex 23 away from backward surface 7c to ensure opened backward gate 29 between reserve and recycle pathways 10 and 11 so that a bill may pass backward gate 29 without operating baffle 14 to leave bottom vertex 21 of baffle 14 in contact or close to bottom surface 7a to block bottom gate 27. FIG. 13 depicts deflector 20 in the recycle position wherein crescent actuator 17 is operated to rotate crescent 15 to move forward and backward vertexes 22 and 23 away from respectively forward and backward surfaces 7b and 7c to have forward gate 28 opening between recycle and shuttle pathways 11 and 5 so that a bill may pass forward gate 28 while bottom vertex 21 of baffle 14 remains in contact or close to bottom surface 7a.

With deflector 20 moved from the original position (FIGS. 8, 10 and 12) to the reserve position (FIG. 9) to define bottom gate 27, a bill inserted into inlet 6 is conveyed by conveyance device 9 through bottom gate 27 between shuttle pathway 9 and reserve pathway 10 via trifurcate intersection 7. When bill has completely passed trifurcate intersection 7, some sensor (not shown) detects passage of bill through gate 27 and forwards a detection signal to validation controller that then produce a drive signal to baffle actuator 16 to bring bottom vertex 21 of baffle 17 into contact or close to bottom surface 7a of intersection 7, thereby returning deflector 20 to the original position shown in FIG. 10.

To transport bill in reserve pathway 10 to recycle pathway 11, as shown in FIG. 11, crescent actuator 17 is operated to move backward vertex 23 of crescent 15 away from backward surface 7c of intersection 7 to have backward gate 29 opening between reserve and recycle pathways 10 and 11. Then, conveyance device 9 is driven to carry bill from reserve pathway to recycle pathway 11 through backward gate 29. When bill has completely passed backward gate 29, some sensor (not shown) detects passage of bill through gate 29 and forwards a detection signal to validation controller that then produce a drive signal to crescent actuator 17 to bring backward vertex 23 of crescent 15 into contact or close to backward surface 7c of intersection 7 to thereby return deflector 20 to the original position.

Figure 5:
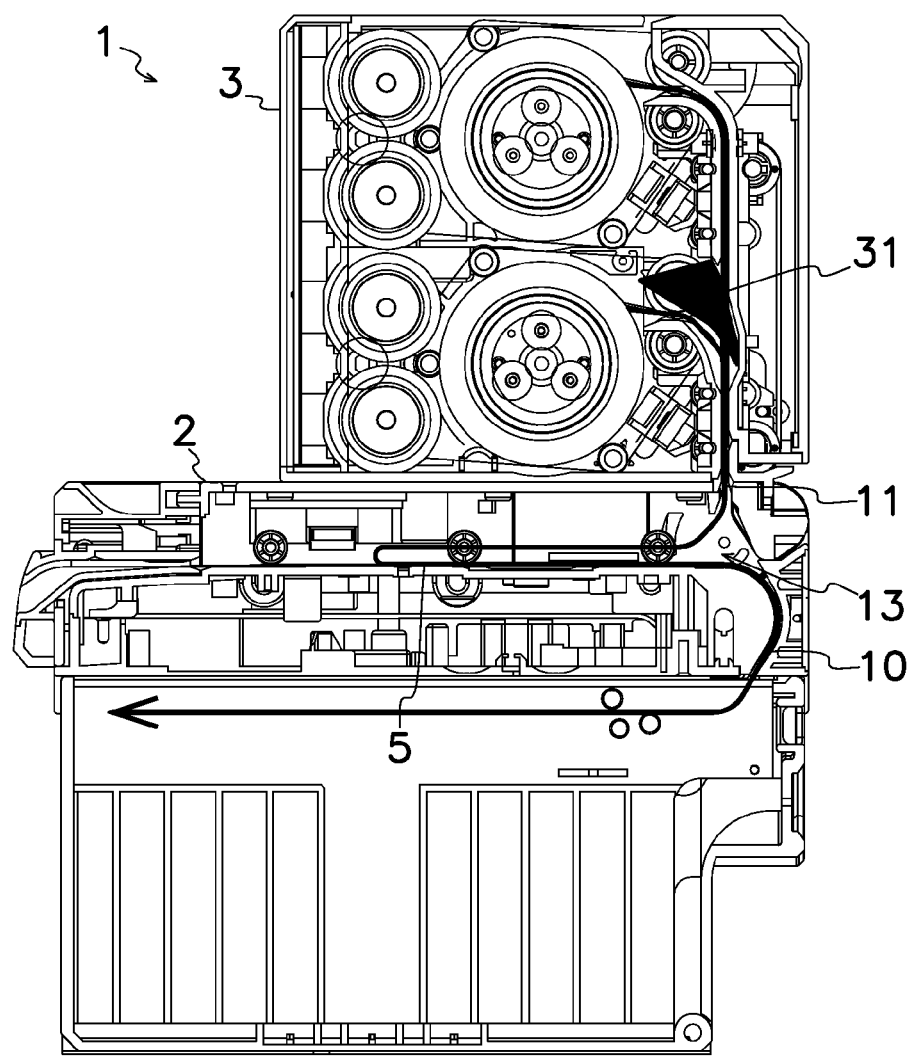
FIG. 5 is a sectional view of the bill validator indicating a bill transported from the shuttle pathway to the recycle pathway after the bill stored in the document recycle box is once removed to the shuttle pathway.
Figure 6:
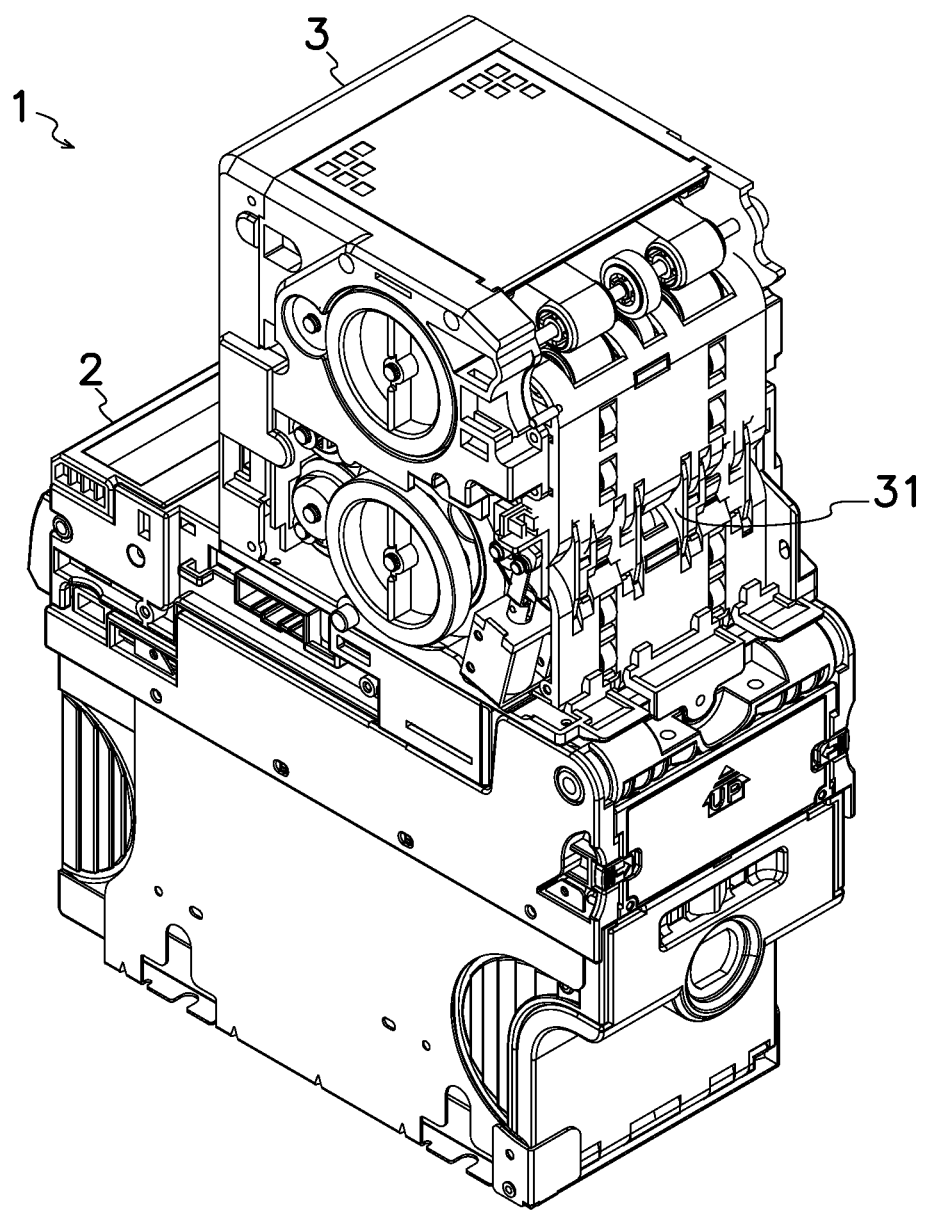
FIG. 6 is a perspective view of the bill validator fitted with a document recycle box with a cover off from the recycle box.
Figure 14:
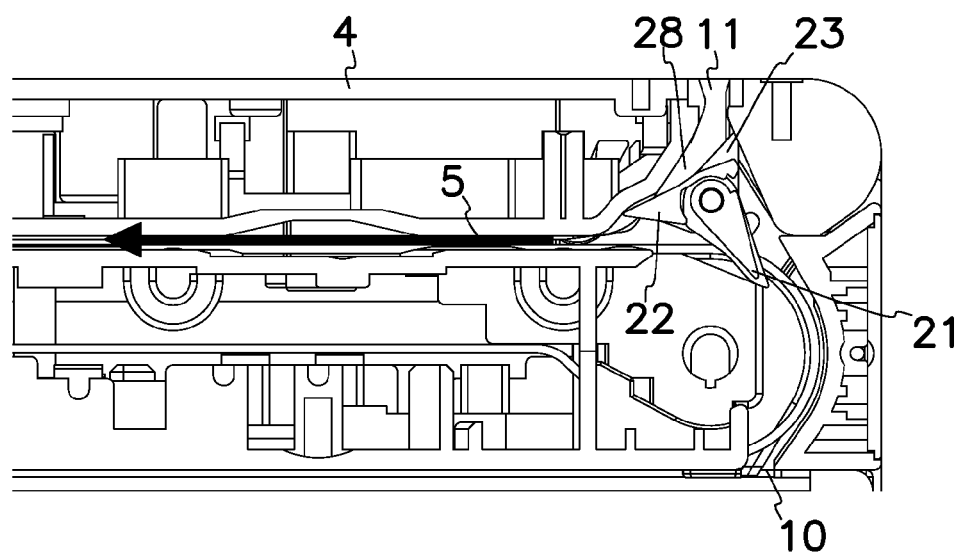
FIG. 14 is a partially enlarged sectional view of the trifurcate intersection with the deflector in the original position, after the bill has completely passed the intersection from the recycle pathway to the shuttle pathway.

To feed a bill stored in recycle box 3 to shuttle pathway 5, the bill is downwardly moved beyond backward vortex 23 of crescent 15 with deflector 20 in the original position (FIG. 12), and when a lowermost end of the bill passes between crescent 15 and forward surface 7b of intersection 7, crescent actuator 17 is operated to rotate crescent 15 to separate backward vortex 23 from backward surface 7c, but keeping forward gate 28 opened (FIG. 13) and keeping bottom vortex 21 of baffle 14 in contact or close to bottom surface 7a so that the bill may smoothly be conveyed or returned from recycle pathway to shuttle pathway 5 through forward gate 28. After the bill has completely moved to shuttle pathway 5, some sensor (not shown) detects passage of bill through gate 28 and forwards a detection signal to validation controller that then produce a drive signal to crescent actuator 17 so that crescent 15 may be rotated to bring forward vertex 22 into contact or close to forward surface 7b to thereby return and retain deflector 20 to the original position (FIG. 14). Then, as shown in FIG. 5, the bill may further be transported from shuttle pathway 5 to reserve pathway 10. In this way, a bill may be once forwarded from recycle box 3 through recycle pathway 11 and trifurcate intersection 7 to shuttle pathway 5, and then be conveyed to reserve pathway 10 in a switchback fashion to stow the bill into reserve chamber 10a of bill stacker from reserve pathway 10. Instead, by reversing operation of conveyance device 9 with deflector 20 in the deposit position shown in FIG. 11, a bill may be carried through recycle pathway 11 and trifurcate intersection 7 directly to reserve pathway 10 to stow the bill into reserve chamber 10a.

As just mentioned, when a bill is conveyed through one of three pathways 5, 10 and 11 to divert it to another of three pathways 5, 10 and 11, turning device 13 may be operated to have the bill easily, smoothly and selectively crossing over to another of three pathways 5, 10 and 11 at trifurcate intersection 7. In this case, the bill may make a bidirectional or unidirectional to another of three pathways 5, 10 and 11. Turning device 13 may be made to have its simplified construction of deflector 20 in Y-shaped junction as well.

Figure 3:
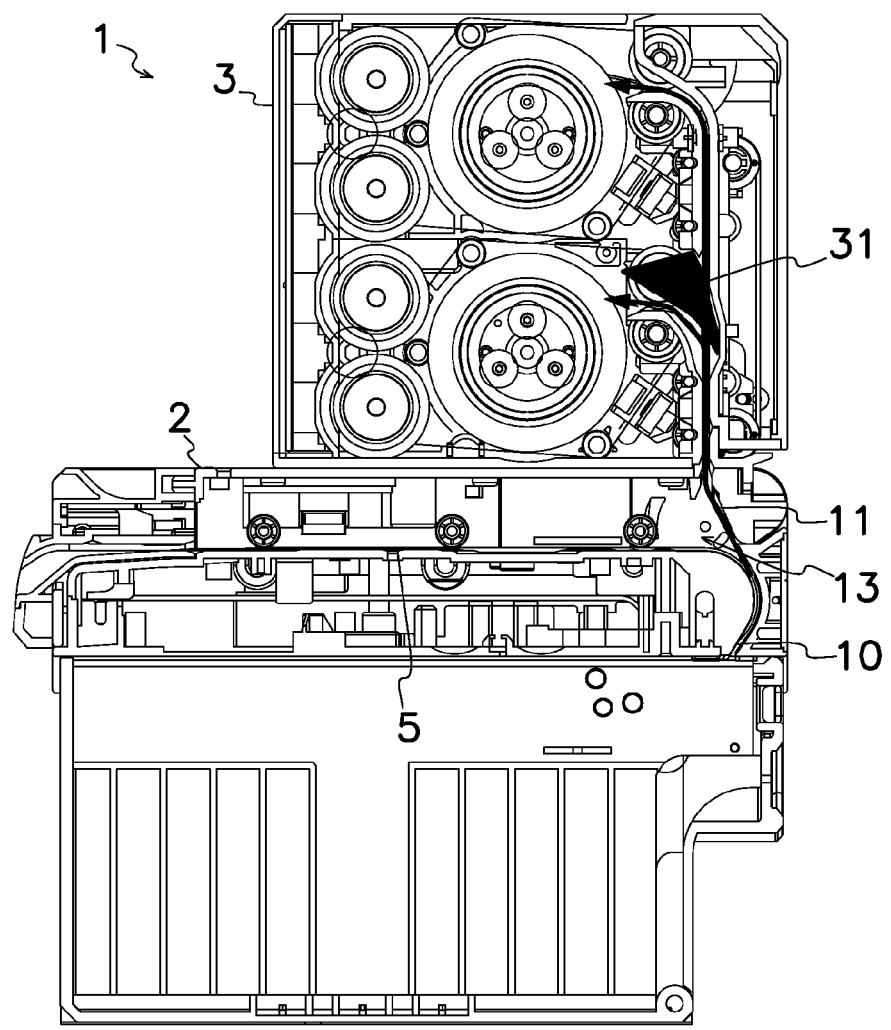
FIG. 3 is a sectional view of the bill validator indicating a bill transported from a reserve pathway to a recycle pathway.
Figure 4:
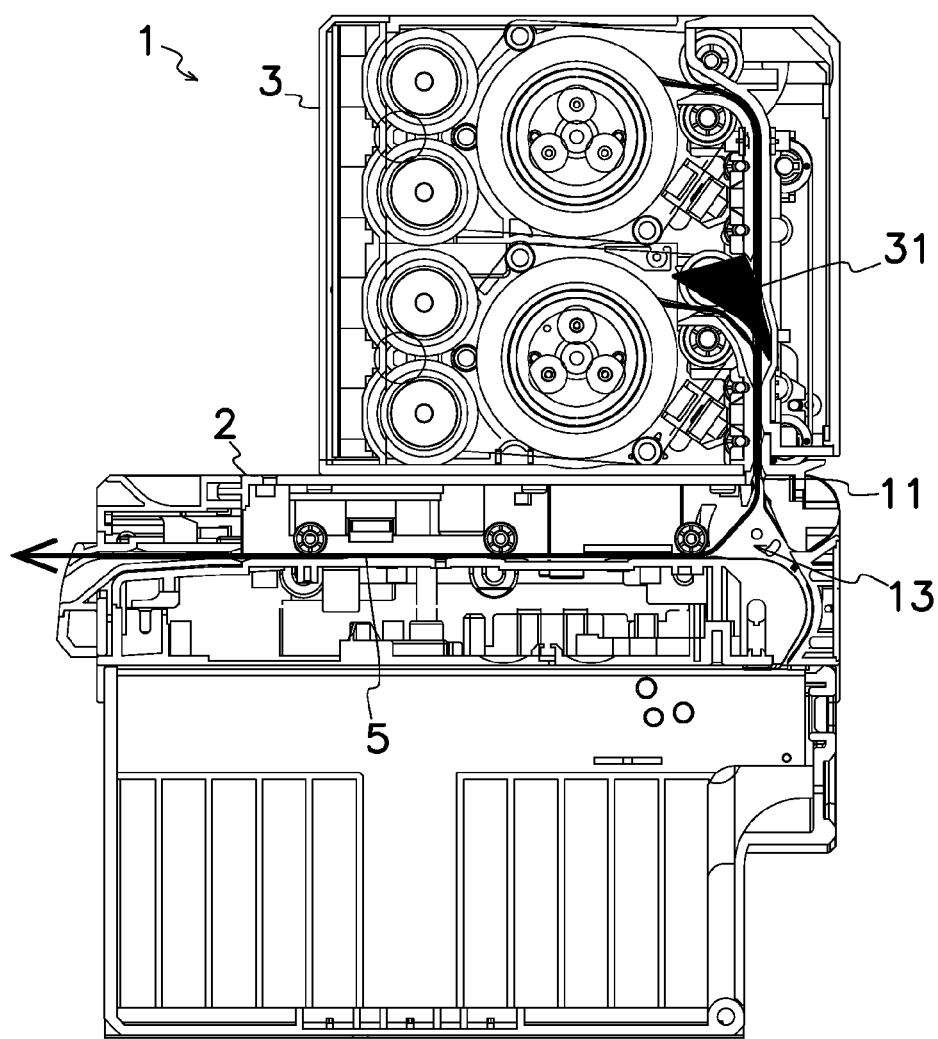
FIG. 4 is a sectional view of the bill validator stored in the document recycle box and transported through the recycle pathway to a shuttle pathway.
Figure 7:
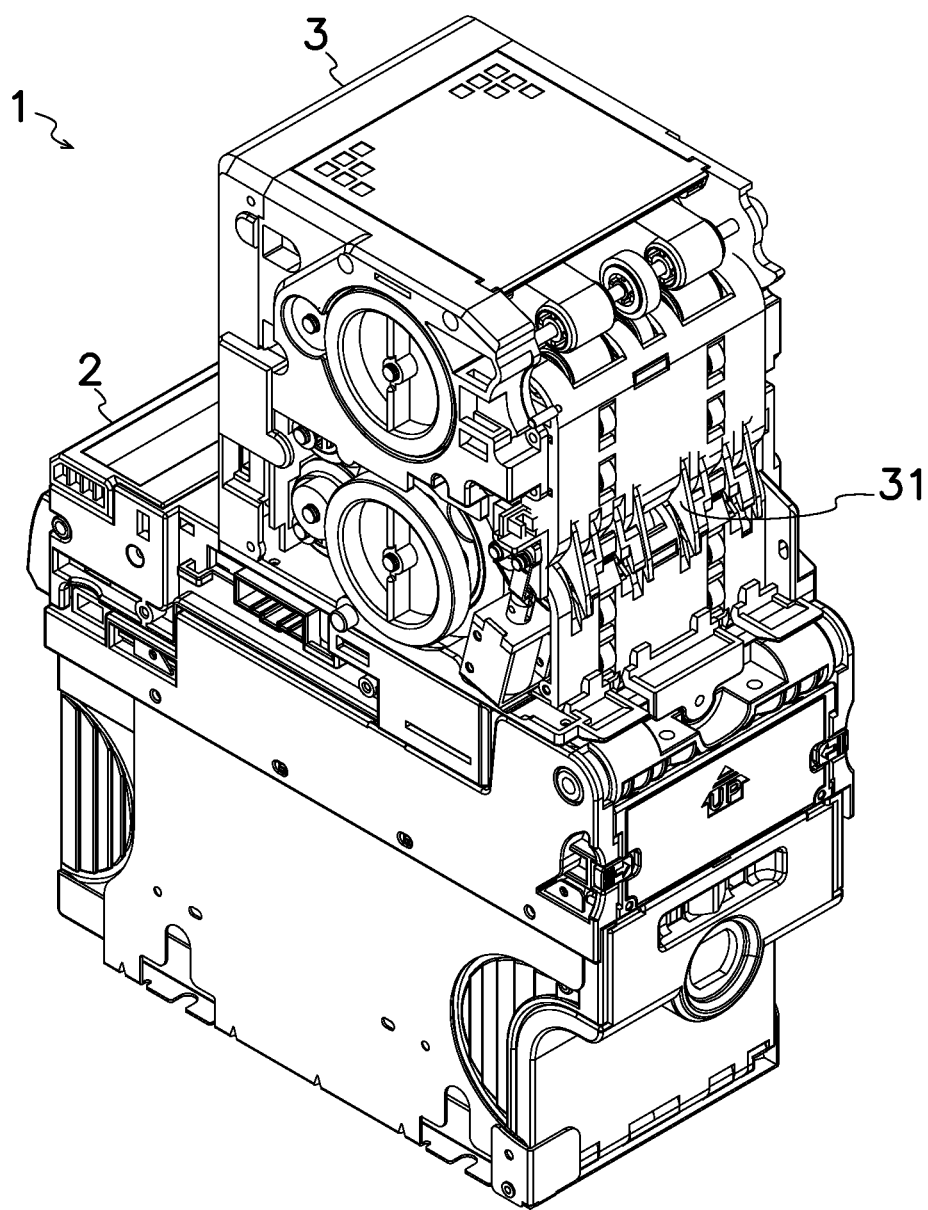
FIG. 7 is a perspective view of the bill validator fitted with the recycle box with a sorter opened.

When a bill is inserted into inlet 6 and transported through shuttle pathway 5, validation sensor 8 detects and forwards characteristics signal of the bill to validation controller that determines a denomination of the bill in view of the characteristics signal and also determines on which lower or upper drum 41 or 42 should wind up the bill of the denomination. When validation controller determines lower drum 41 to wind up or involve the bill, it drives sorter 31 to open as shown in FIGS. 3, 4 and 7 to communicate lower drum 41 and lower passage 62 with recycle pathway 11 and rotates lower drum 41 in the forward direction while shutting off recycle pathway 11 toward upper drum 42. At the moment, after the bill is moved from shuttle pathway 5 once to reserve pathway 10 (FIGS. 9 and 10), then it is moved from reserve pathway 10 to recycle pathway 11 by conveyance device 9 (FIG. 11) so that lower drum 41 may wind up the bill after transit through recycle pathway 11 and lower passage 62.

To unwind a bill from lower drum 41 and send it to shuttle pathway 5, as shown in FIGS. 12 and 13, validation controller drives sorter actuator 32 to open sorter 31 and rotates lower drum 41 in the adverse direction to deliver the bill along recycle pathway 11 by recycle conveyor device 50 and conveyance device 9 so that the bill is transported from lower drum 41 through opening 18 and recycle pathway 11 to shuttle pathway 5 as shown in FIGS. 12, 13 and 14.

When validation controller decides the winding around upper drum 42 of a bill of different denomination transported along shuttle pathway 5, sorter actuator 32 is operated to move sorter 31 to close lower passage 62 (FIGS. 6 and 15) but open recycle pathway 11 to communicate with upper passage 63 while upper drum 42 is rotated in the forward direction. Then, a bill is conveyed through recycle pathway 11 by recycle conveyor device 50 to desirably wind up the bill around upper drum 42. To unwind a bill from upper drum 42 and send it to shuttle pathway 5, validation controller drives sorter 31 to move in the opened condition (FIGS. 6 and 15) and at the same time rotates upper drum 42 in the adverse direction to deliver the bill along recycle pathway 11 by recycle conveyor device 50 and conveyance device 9 so that the bill is transported from upper drum 42 through opening 18 and recycle pathway 11 to shuttle pathway 5 as shown in FIGS. 12, 13 and 14.

Embodiments of the invention contemplates detachable attachment of recycle box 3 to bill validator 2 so that slit 61 of recycle pathway 11 in recycle box 3 is in alignment with opening 18 of bill validator 2. When recycle box 3 is removed from bill validator 2, recycle box 3 has a high antitheft property of bills stored in lower or upper drum 41 or 42 because recycle box 3 has its strong security structure that makes it very difficult or impossible to gain unauthorized access to bills in lower or upper drum 41 or 42 by inserting any extracting tool into slit 61, recycle pathway 11 and lower or upper passage 62 or 63 reaching lower or upper drum 41 or 42.

Cover 52 is locked with a locking device (not shown) in the closed condition (FIG. 15) to housing 60. When a bill is jammed or stuck in recycle pathway 11 within recycle box 3, locking device may be unlocked to open cover 52 to easily remove jammed bill for reuse of recycle box 3.

Figure 15:
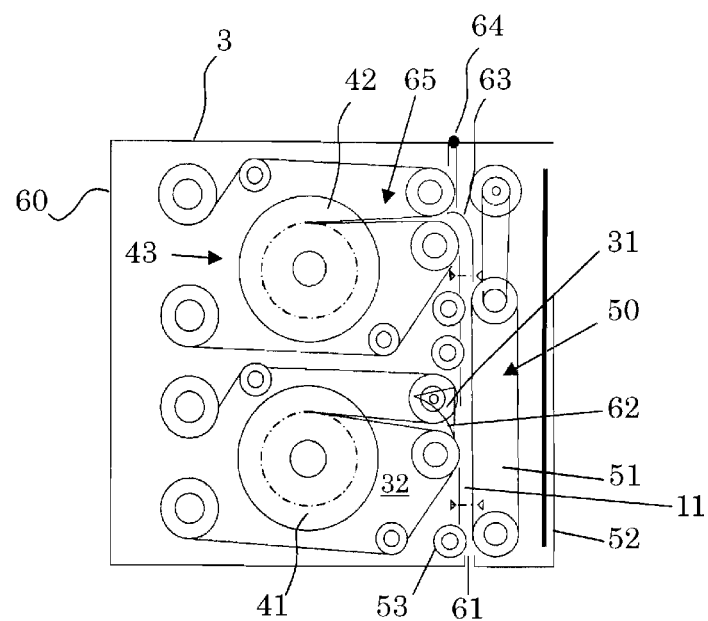
FIG. 15 is a sectional view of a document recycle box with the sorter in the closed position.
Figure 16:
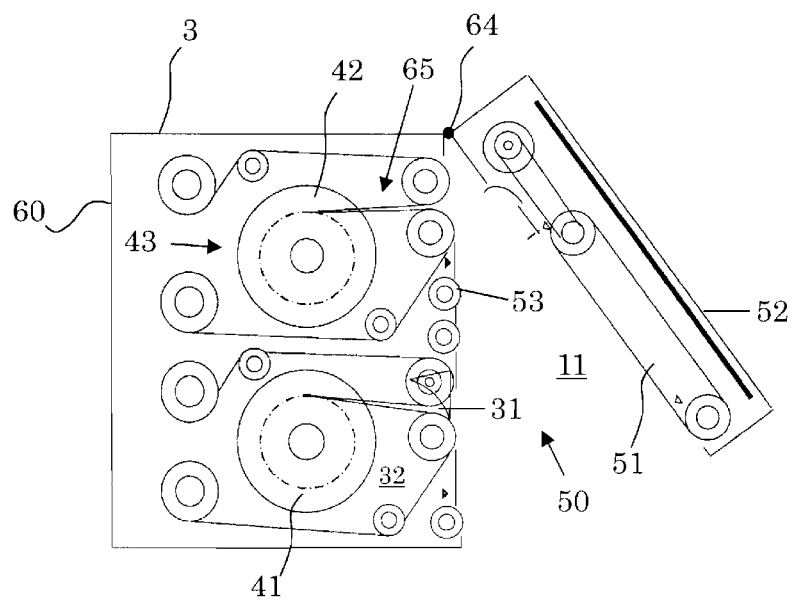
FIG. 16 is a sectional view of the recycle box with a cover opened.
Figure 17:
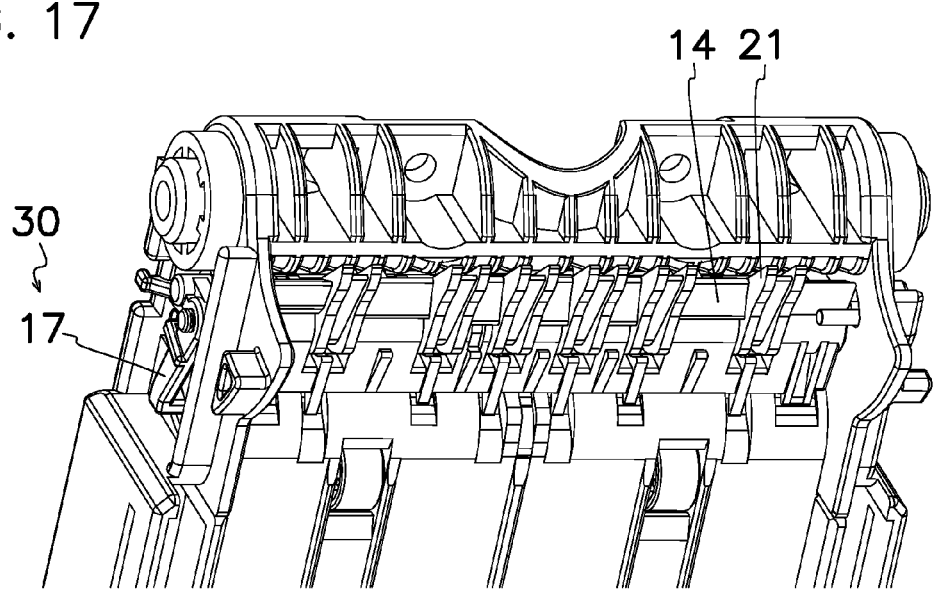
FIG. 17 is a partial perspective view of the deflector in the original position seen from underneath.
Figure 18:
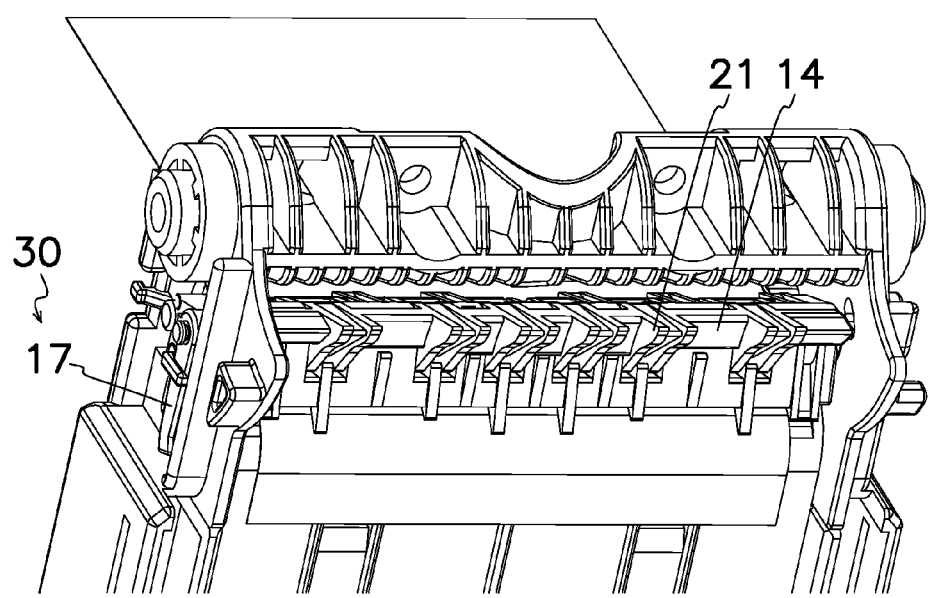
FIG. 18 is a partial perspective view of the deflector in the recycle position seen from underneath.
Figure 19:
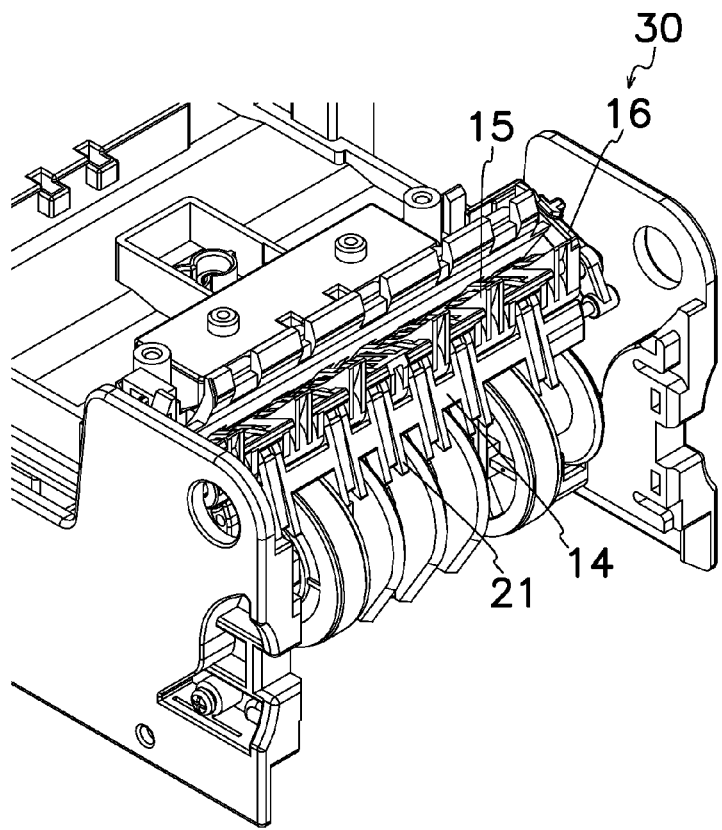
FIG. 19 is a partial perspective view of the deflector in the original position seen from above.
Figure 20:
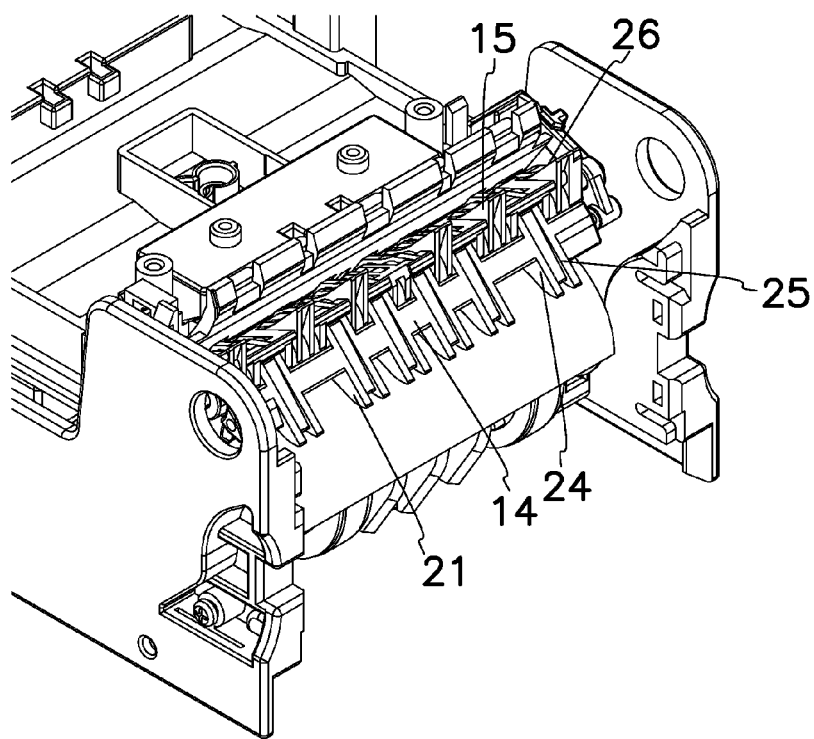
FIG. 20 is a partial perspective view of the deflector in the reserve position seen from above.
Figure 21:
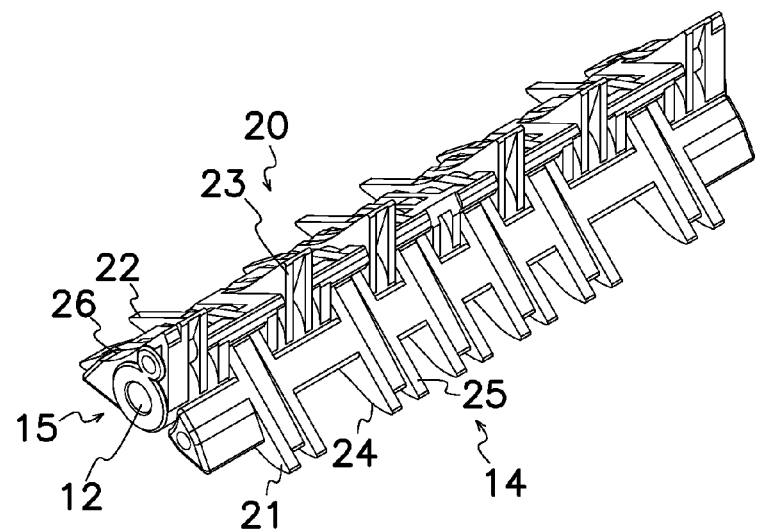
FIG. 21 is a partial perspective view of the deflector.
Figure 22:
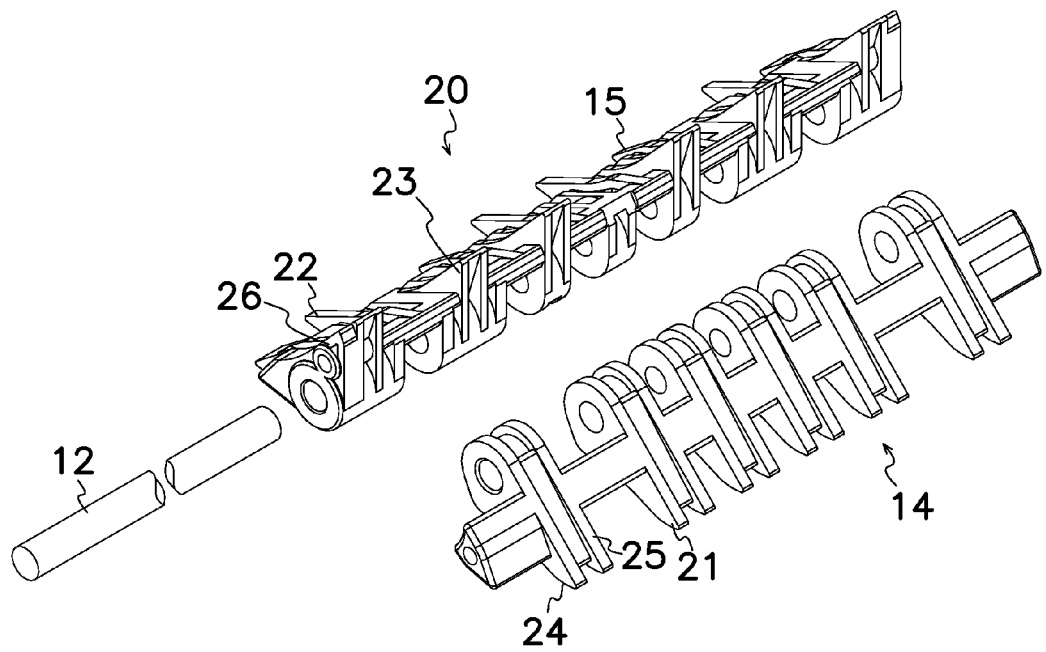
FIG. 22 is an exploded perspective view of the deflector.

The foregoing embodiments of the present invention may be modified or changed in various ways. For example, FIGS. 15 and 16 illustrate the embodiment for sandwiching a bill between convey belt device 51 and rollers 53 to transport the bill along recycle pathway 11, however, instead of rollers 53, an opposite convey belt device (not shown) may be arranged opposite to convey belt device 51 to sandwich a bill between convey belt device 51 and opposite convey belt device to transport the bill along recycle pathway 11. In this case, when cover 52 is opened from housing 60, convey belt device 51 is moved away from opposite convey belt device to easily remove jammed bills from recycle pathway 11. Also, the shown embodiment illustrates convey belt device 51 attached to cover 52 and rollers 53 attached to housing 60, however instead of rollers 53, opposite convey belt device may be arranged on housing 60. Otherwise rollers 53 or opposite convey belt device may be attached to cover 52, and convey belt device 51 may be attached to housing 60. FIGS. 9 and 10 illustrate transportation of bill from shuttle pathway 5 to reserve pathway 10, however, it is apparent that a bill may adversely be transported from reserve pathway 10 to shuttle pathway 5 by reversing operation of conveyance device 9 in the reserve position of deflector 20 shown in FIG. 9. Likewise, in the deposit position of deflector 20 shown in FIG. 11, a bill may adversely be transported from recycle pathway 11 to reserve pathway 10 by reversing operation of conveyance device 9. Also, in the recycle position of deflector 20 shown in FIG. 13, a bill may adversely be transported from shuttle pathway 5 to recycle pathway 11 by reversing operation of conveyance device 9. Accordingly, the embodiments of the present invention are applicable to document handlers that transports documents, having them unidirectionally or bidirectionally crossing over from one to another of three pathways 5, 10 and 11 at trifurcate intersection 7. The present invention is applicable to document recycle boxes removably attached to document or bill validators.

The invention claimed is:
1. A document recycle box comprising:
a housing,
a recycle conveyor device for transporting documents along a recycle pathway that extends within the housing,
a cover rotatably attached to the housing for releasing the cover from the housing to remove the documents from the recycle pathway, and
a drum device having lower and upper drums each rotatably disposed within the housing for winding up the documents supplied through the recycle pathway for storage of the documents within each of the lower and upper drums and also for unwinding the stored documents from each of the lower and upper drums to dis- charge the documents out of the housing through the recycle pathway by the recycle conveyor device, wherein the recycle pathway comprises a slit formed between the housing and cover, a lower passage for guiding the documents transported between the lower drum and recycle pathway for communication of the lower passage with the slit, and an upper passage formed above the lower passage for guiding the documents transported between the upper drum and recycle pathway for communication of the upper passage with the slit, and the recycle conveyor device comprises a sorter mounted at the recycle pathway for sorting the documents transported along the recycle pathway into the lower or upper drum.

2. The document recycle box of claim 1, wherein the slit is formed between the housing and cover.

3. The document recycle box of claim 1, wherein the recycle pathway generally vertically extends from the slit.

4. The document recycle box of claim 1, further comprising a sorter actuator for driving the sorter to sort the documents into the lower or upper drum.

5. The document recycle box of claim 1, wherein the recycle conveyor device comprises a convey belt device attached to one of the housing and cover along one side of a recycle pathway, and a plurality of rollers or an opposite convey belt device attached to the other of the housing and cover along the other side of the recycle pathway on the opposite side of the convey belt device for transporting the documents along the recycle pathway in cooperation with the convey belt device to move the convey belt device away from the rollers or opposite convey belt device when the cover is released from the housing.

6. A document recycle box comprising:

a housing, a recycle conveyor device for transporting documents along a recycle pathway that extends within the housing, a cover rotatably attached to the housing for releasing the cover from the housing to remove the documents from the recycle pathway, a drum device having lower and upper drums each rotatably disposed within the housing for winding up inside the documents supplied through the recycle pathway during its forward rotation for storage of the documents, and also for unwinding and discharging the stored documents outside during its adverse rotation to transport the documents out of the housing through the recycle pathway by the recycle conveyor device, wherein the recycle pathway comprises a slit formed between the housing and cover, a lower passage for guiding the documents transported between the lower drum and recycle pathway for communication of the lower passage with the slit, and an upper passage formed above the lower passage for guiding the documents transported between the upper drum and recycle pathway for communication of the upper passage with the slit.

7. The document recycle box of claim 6, wherein the recycle conveyor device comprises a convey belt device attached to one of the housing and cover along one side of a recycle pathway, and a plurality of rollers or an opposite convey belt device attached to the other of the housing and cover along the other side of the recycle pathway on the opposite side of the convey belt device for transporting the documents along the recycle pathway in cooperation with the convey belt device to move the convey belt device from the rollers or opposite convey belt device when the cover is released from the housing.

8. A document recycle box removably attached to a document validator, the document validator comprising:

a case having a trifurcate intersection, a shuttle pathway, a reserve pathway and a recycle pathway each connected to the trifurcate intersection, and a turning device operated to have a document crossing over from one to another of the shuttle, reserve and recycle pathways at the trifurcate intersection, the recycle box comprising:

a housing removably attached to a case of the validator, a recycle conveyor device for transporting documents along the recycle pathway that extends within the housing from the trifurcate intersection of the document validator, and a drum device rotatably disposed within the housing for winding up the documents supplied from the intersection of the validator by the recycle conveyor device through the recycle pathway for storage of the documents within the drum device, and also for unwinding the stored documents to discharge the documents to the intersection of the validator through the recycle pathway by the recycle conveyor device.

9. The document recycle box of claim 8, wherein the turning device has a deflector formed with three vertexes rotatably mounted on a pivot shaft in the intersection, and the document validator further comprises an actuating device for controlling document's passages through between selected two of the shuttle, reserve and recycle pathways by rotating the deflector of the turning device to cause the three vertexes to come into contact or close to or to come free from related surfaces of the intersection.

10. The document recycle box of claim 8, wherein the document validator further comprises a conveyance device for transporting the documents along the shuttle, reserve and recycle pathways, to transport the documents from the shuttle pathway to the reserve pathway when a bottom vertex of the deflector leaves in contact or close to a bottom surface of the intersection, to transport the documents from the reserve pathway to the recycle pathway when a backward vertex of the deflector leaves in contact or close to a backward surface of the intersection, and to transport the documents from the recycle pathway to the shuttle pathway when a forward vertex of the deflector leaves in contact or close to a forward surface of the intersection.

11. The document recycle box of claim 8, wherein the recycle conveyor device comprises a convey belt device of attached to one of the housing and cover along one side of the recycle pathway, and a plurality of rollers or an opposite convey belt device attached to the other of the housing and cover along the other side of the recycle pathway on the opposite side of the convey belt device for transporting the documents along the recycle pathway in cooperation with the convey belt device, wherein the recycle box further comprises a cover rotatably attached to the housing for releasing the cover from the housing to move the convey belt device of the recycle conveyor device away from the rollers or the opposite convey belt device.

* * * * *